though my invention pertains to a wide variety of electrically heated devices, it is particularly useful in connection with electrically heated utensils for preparation of food or beverages and the like and, for purposes of setting forth the invention, I shall illustrate and describe it in connection with such a utensil, namely, an electrically heated skillet. It will be understood, however, that the invention has much wider applicability.

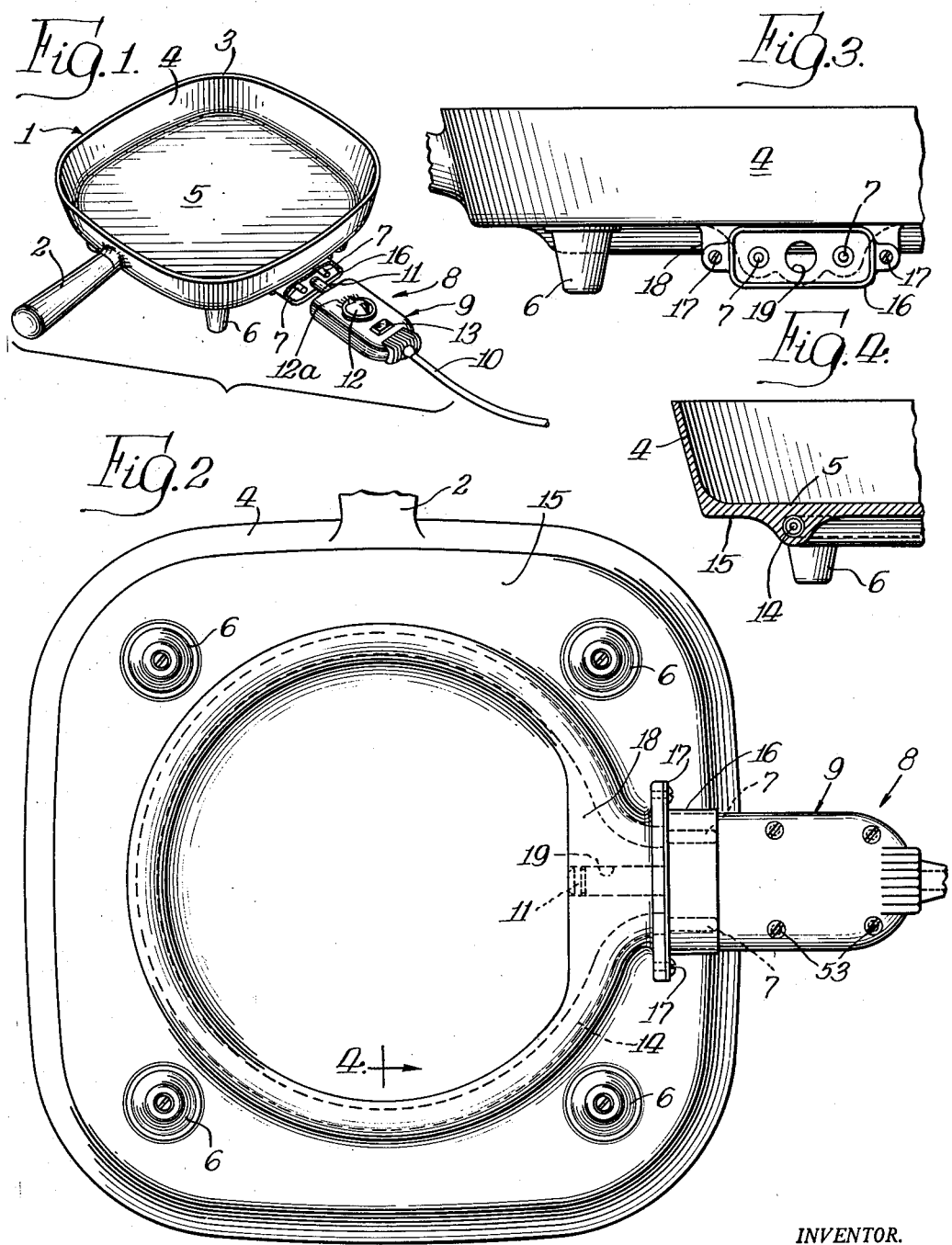

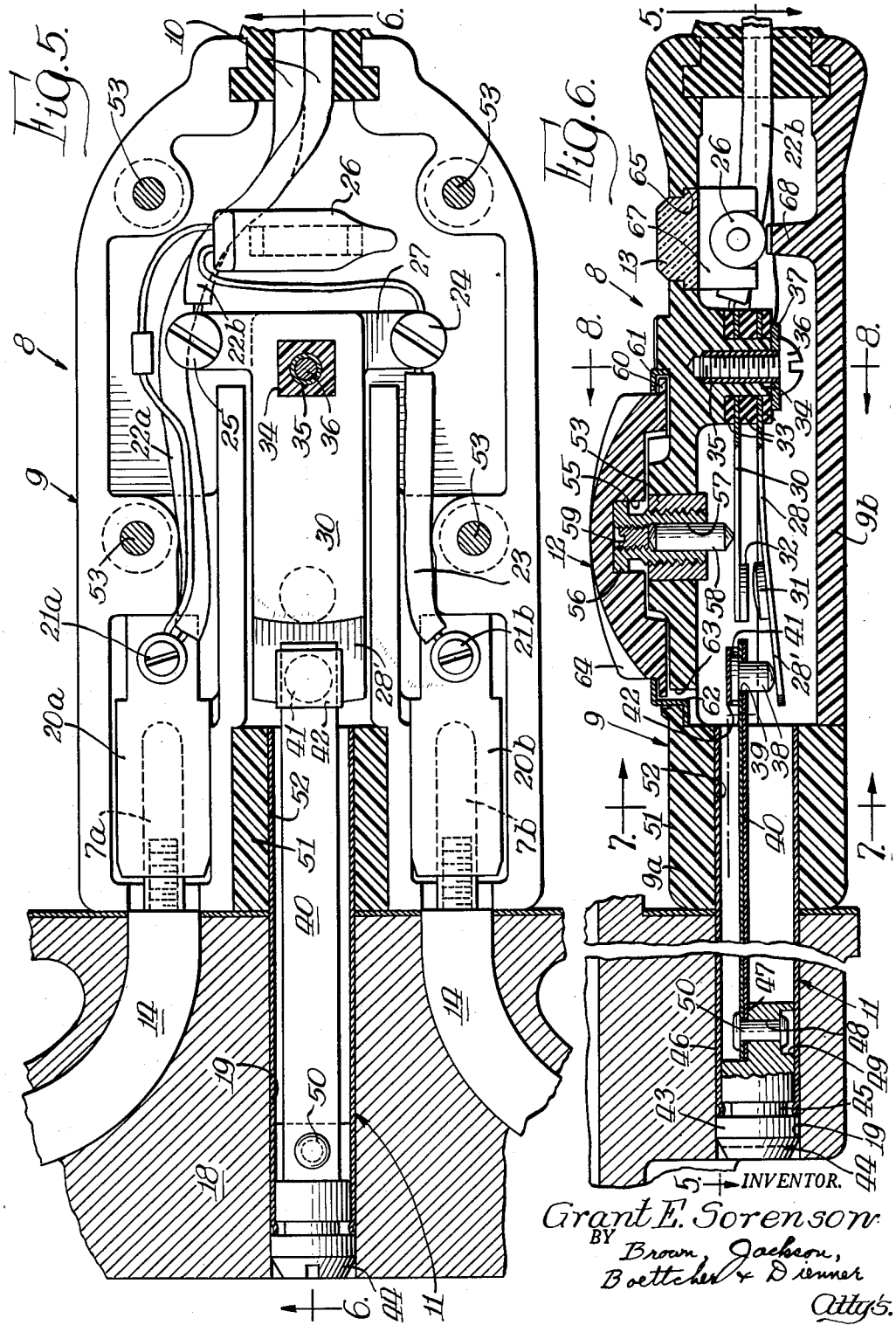

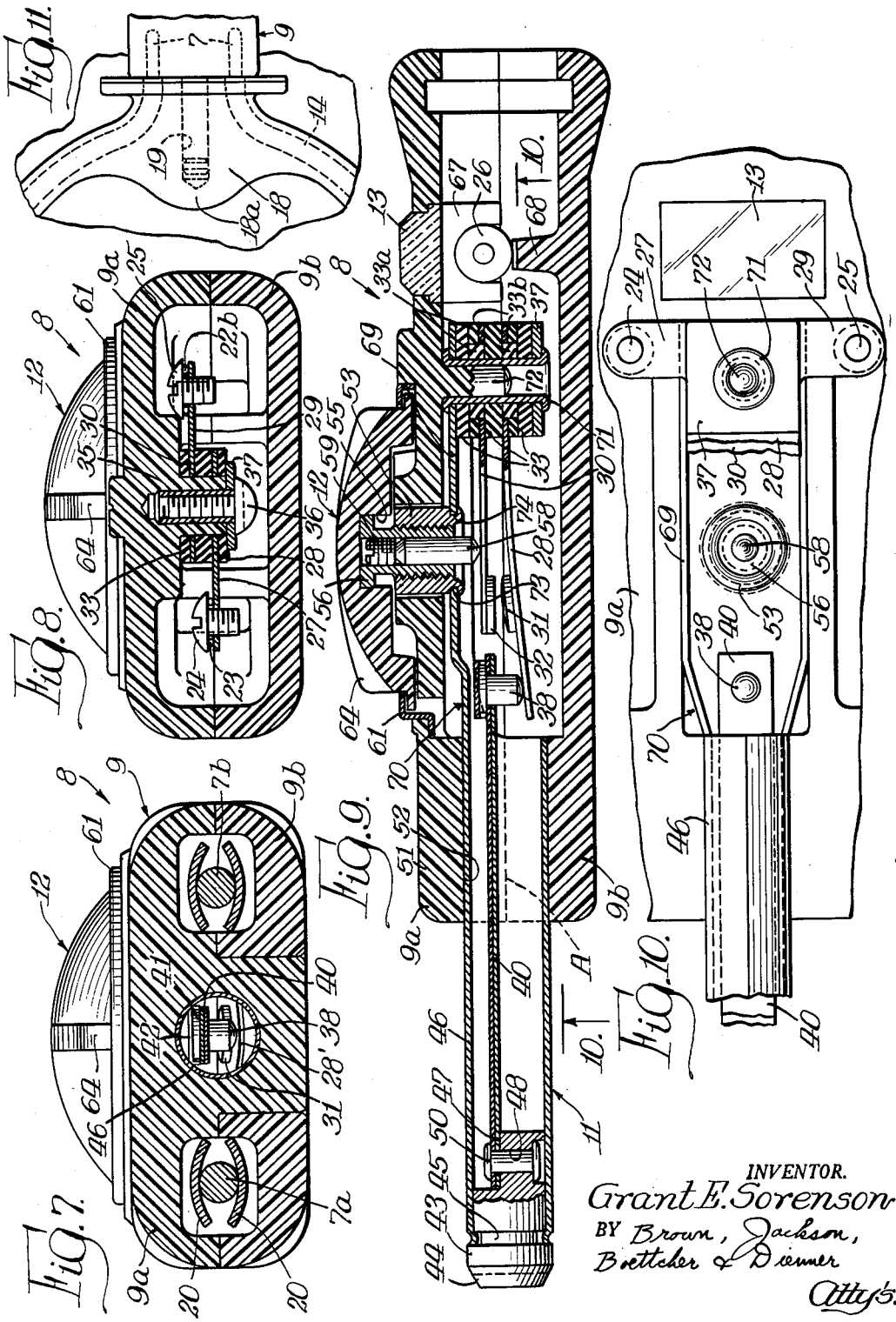

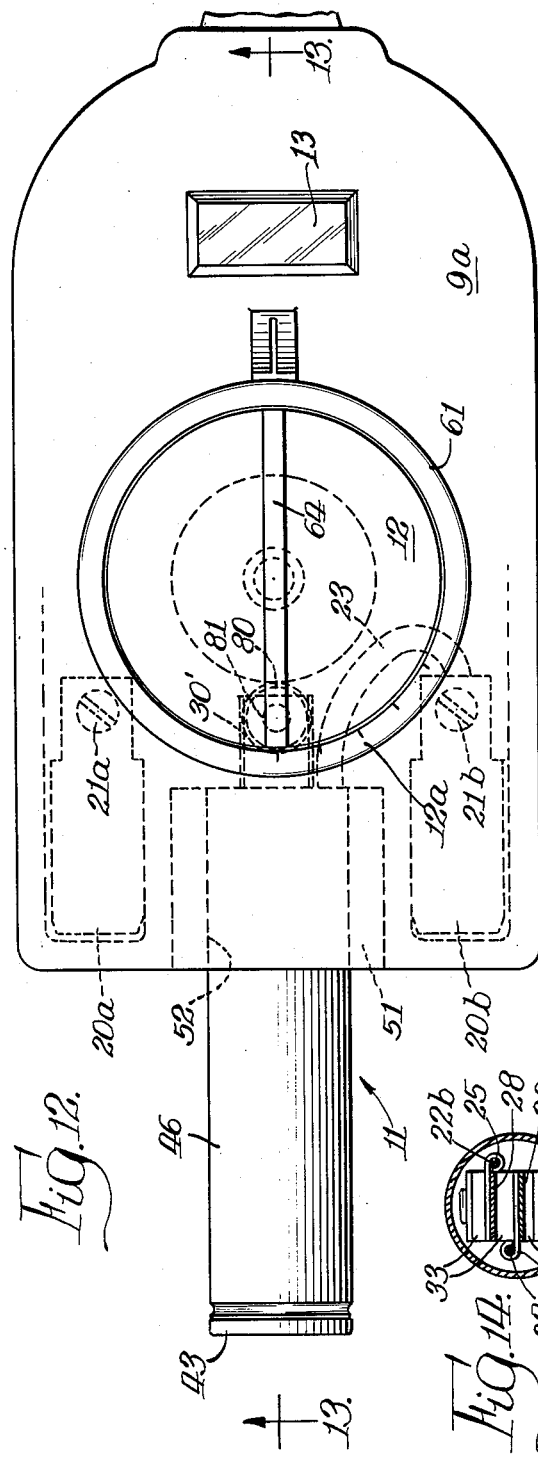
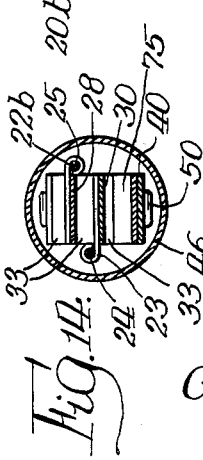
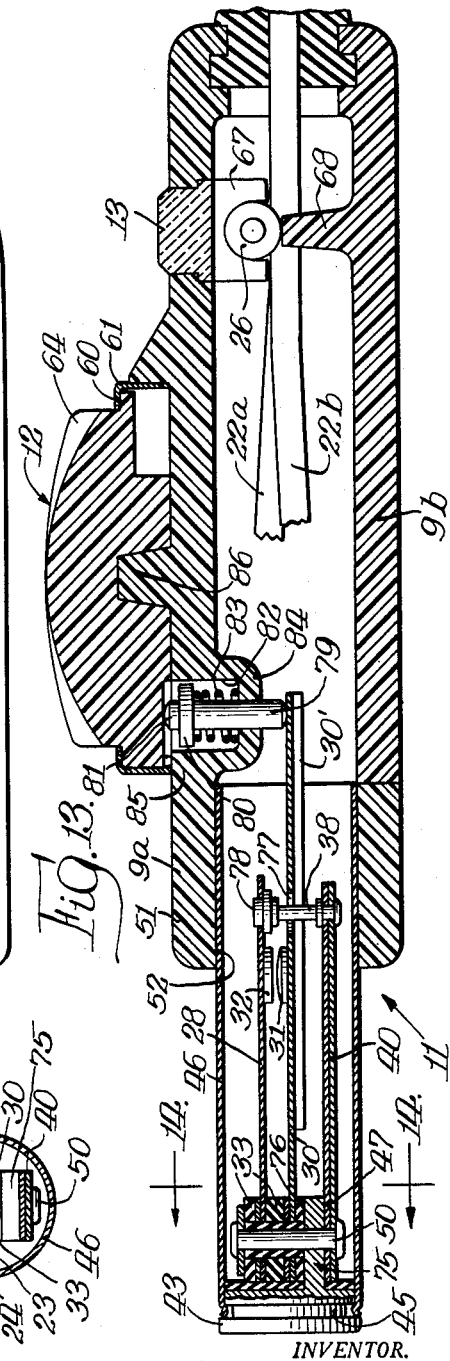
INVENTOR.
Grant E. Sorenson,
BY Brown, Jackson,
Boettcher & Dienner
Attys.

United States Patent Office 3,007,028
Patented Oct. 31, 1961

3,007,028
ELECTRICALLY HEATED DEVICE WITH PLUG-IN THERMOSTAT
Grant E. Sorenson, Eau Claire, Wis., assignor to National Presto Industries, Inc., Eau Claire, Wis., a corporation of Wisconsin
Filed June 28, 1955, Ser. No. 518,511
15 Claims. (Cl. 219—44)

My invention relates to electrically heated devices having what I call a "plug-in thermostat" for use in controlling the amount of heat delivered to the device.

While my invention pertains to a wide variety of electrically heated devices, it is particularly useful in connection with electrically heated utensils for preparation of food or beverages and the like and, for purposes of setting forth the invention, I shall illustrate and describe it in connection with such a utensil, namely, an electrically heated skillet. It will be understood, however, that the invention has much wider applicability.

There are presently on the market various forms of electrically heated cooking utensils for domestic use such as skillets, deep fat fryers, baking and roasting utensils, and also electrically heated beverage makers and the like, which are provided with thermostatic controls by which the temperature of the device may be automatically controlled by a pre-selected manual setting of the controls by the user. In many of these devices it has been customary to affix the thermostatic controls directly to the wall or surface of the device with the result that the device may not be submerged in a dishpan or the like without damaging the controls. While such controls can have waterproof covers associated with them, that adds to the manufacturing cost and complexity of the device and generally is not satisfactory.

Some utensils on the market today have placed the thermostatic controls and switches in a handle of the device so that at least a portion of the device may be submerged but not the entire utensil. While that is of some assistance, it also is not entirely satisfactory, for there is danger that the handle and the chamber within it, in which the thermostatic controls are positioned, will draw moisture and render the controls ineffective.

Another defect of many of the current utensils is that the temperature sensing means for the thermostatic control is not situated in such a way as to give a true measure of the temperature of that part of the utensils where the food or other substance is being heated. It will be readily seen that the more remote the thermostatic control and its sensing means are from the cooking surface of a skillet, the less accurate will be the sensing of the temperature and therefore the less accurate will be the control of temperature.

A further disadvantage of many of the present utensils resides in the fact that when they need servicing it is usually found to be the controls which need adjustment or replacement and the entire utensil must be delivered to the repairman or sent to the manufacturer, since the thermostatic controls form a fixed part of the utensil. Furthermore, because the controls constitute a fixed part of the utensil, the utensil must be handled carefully in order that the more delicate controls will not be damaged or put out of adjustment.

Now, according to my invention, all of the foregoing disadvantages are eliminated and additional advantages are gained by a new and improved arrangement of the utensil wherein the thermostatic control is selectively separable from the utensil. This results in a number of advantages, namely, a utensil which is completely submersible for cleaning and scouring (including its handle); simplified servicing of the utensil since most frequently the adjustment must be of the controls rather than of the cooking utensil itself; the utensil is more easily stored and may be treated with less car without endangering the controls which are separable; damage to either the controls or the vessel separately does not require that both parts be sent for servicing or replacement; and the controls may be interchangeable with other cooking utensils which incorporate my invention thereby reducing the number of controls needed.

It is a further object of my invention to provide a separable set of controls for an electrically heated utensil which, in cooperation with the utensil, provides accurate sensing of the temperature of those regions of the utensil in connection with which the food, beverage or other substance is associated. This results in several advantages, namely, an accurate sensing of the cooking heat, an ability to follow recipes and achieve desired results because of proper temperatures being employed; and quicker sensing of temperatures, thereby reducing overcooking.

A further object of the invention is to provide an electrical control and temperature sensing mechanism in a separable device associated with the ordinary current carrying electric cord. Such arrangement provides several advantages among which are the following: ease of storage, ability to be used interchangeably with several cooking utensils, and an absence of loose or movable parts such as knobs, levers or switches on the utensil itself.

I provide a novel form of temperature sensing probe in connection with the thermostatic control means which probe and control means are separable from the body of the utensil. The probe is adapted to be positioned in a mating cavity in the body of the vessel so that the temperature sensed is that which is heating the contents of the utensil rather than a temperature of a part of the utensil remote from its contents, or an ambient temperature. By having the probe in a cavity of the utensil, ambient temperatures will not affect it, as is the case with practically all of the other thermostatic controls now in use on such utensils.

It is a further object of my invention to provide with the thermostatic control means and sensing probe a standard form of female plug which engages the male terminals which form a part of the vessel itself.

It is a further object and advantage of the invention that the aforementioned structure is simplified and so put together as to maintain the accuracy of its setting; it is electrically safe; and it is more easily and cheaply manufactured and sturdier than prior structures.

Because the separable sensing proble, thermostatic control means and electrical connections are provided in a structure which is simple and similar to the ordinary plug-in type of electric cord and socket combination, any person, however unskilled, can use the structure without instructions or precautions.

Further objects, advantages and uses of my invention will be obvious or will become apparent when considered in conjunction with the following description and drawings, in which:

FIGURE 1 is a perspective view on reduced scale illustrating the components of the invention in separated condition but aligned to show their relationship;

FIGURE 2 is a bottom plan view of the structure of FIGURE 1 but showing the components associated for use;

FIGURE 3 is a fragmentary elevational view of the right hand, near side of the utensil of FIGURE 1;

FIGURE 4 is a fragmentary sectional view on the line 4—4 of FIGURE 2;

FIGURE 5 is an enlarged sectional view on the line 5—5 of FIGURE 6 showing principally the control means;

FIGURE 6 is a vertical sectional view on the line 6—6 of FIGURE 5;

FIGURE 7 is a sectional view on the line 7—7 of FIGURE 6;

FIGURE 8 is a sectional view on the line 8—8 of FIGURE 6;

FIGURE 9 is a vertical sectional view of a modified control structure on enlarged scale;

FIGURE 10 is a fragmentary view, with portions broken away, taken along the line 10—10 of FIGURE 9;

FIGURE 11 is a fragmentary view showing a modified cavity for the utensil in which the temperature sensing probe is situated;

FIGURE 12 is a top plan view of another form of control structure;

FIGURE 13 is a sectional view on the line 13—13 of FIGURE 12; and

FIGURE 14 is a sectional view on the line 14—14 of FIGURE 13.

Referring first to FIGURE 1, and then to FIGURES 2 through 8, the utensil, in the form of an electrically heated skillet, is indicated generally by the reference numeral 1. There is a handle 2 extending from the vessel portion 3, the latter comprising a side wall 4 and a bottom wall 5 on which food, or the like, is disposed for being heated. A cover (not shown) may be employed if desired. The vessel portion 3 is supported by a plurality of legs 6 and beneath one side of the wall portion 4 there extend outwardly from the utensil a pair of male electric terminals 7 of a standard type. These terminals are preferably located about 90° from handle 2 and are associated with heating element 14 of a known type which is disposed in the bottom of the utensil when the latter is cast. Said heating element and terminal assembly is of water proof construction whereby the utensil 1 may be completely submerged in water for cleaning or scouring.

To the right of the utensil in FIGURE 1 is another component of the structure which I shall refer to generally by the reference numeral 8 and shall designate generally by the name "control."

This control has a housing indicated generally by the reference numeral 9 from which there extends at one end a standard form of electrical cord 10 which, at its right end as viewed in FIGURE 1, would have a male form of plug for connecting with a wall socket. Extending from the other end of the housing 9 is a temperature sensing probe indicated generally by the reference numeral 11. On the exterior of the housing there is a manually settable dial or pointer 12 by which the user may select the heating temperature desired. A scale 12a on the housing 9 indicates "off" and various heating positions for dial 12. There is also a window or opening 13 through which may be viewed an indicating light which when lit, tells the user that electrical current is flowing through the heating element 14 of the utensil for heating the same.

As may be seen in FIGURES 3 and 4, the utensil 1 has a tubular metal-sheathed heating element 14 cast into the bottom wall 5 on its under side 15. As shown, the heating element is cast-in the bottom wall and its terminals 7 extend outwardly therefrom. A guard 16 (partially broken away in FIG. 1) surrounds the terminals 7 and is fastened as by screws 17 to a portion 18 of the utensil 1. The portion 18 has a bore or cavity 19 providing a temperature sensing zone into which the probe 11 is inserted during use, as may be best seen in FIGURE 2. The terminals 7 of the heating element 14 are so constructed and arranged that water cannot get into the heating element 14. That waterproof arrangement is known and, of itself, forms no specific part of the invention.

As may be seen from FIGURE 2, the heating element 14 extends over a substantial area of the bottom wall 5 and is so located as to supply heat equally over the bottom wall in order to uniformly heat whatever material is put into the utensil. In the form shown, the heating element is generally circular, although it need not be confined to that shape. Its terminals 7 are parallel and spaced apart and the cavity 19 has its axis generally parallel to the terminals and is disposed between them, centrally. It will be understood that the terminals 7 and cavity 19 do not have to be in a horizontal plane as shown but could be inclined if desired. However, preferably, they should be parallel to each other. It will be understood, also, that the cavity 19 need not be centrally located between the terminals 7 and would not have to be in the same general plane.

As will be seen from FIGURES 2, 3 and 4, the temperature sensing probe 11, when inserted into the mating cavity 19, is disposed closely adjacent to the bottom wall 5 which provides the heating area for the material in the utensil. The probe is, therefore, able to sense accurately the temperature of that portion of the utensil which is used for the preparation of food and the user thereby obtains an advantage in being able to control the heating of the bottom wall 5 to the exact desired temperature by an appropriate setting of the manually settable dial 12.

As may be noted in FIGURE 11, the cavity 19 need not extend all the way through the portion 18 of the utensil (as it has been shown in FIGURE 2) but may, instead, be closed by an end wall portion 18a. In either arrangement the temperature sensing probe is entirely surrounded by metal which is receiving the heat from the heating element 14 and is not exposed to ambient temperatures which adversely affect the accuracy of the reading of the temperature of the bottom wall 5 of the utensil.

Referring more specifically now to FIGURES 5 and 6, wherein the control 8 is shown on enlarged scale, it will be seen that the terminals 7 (here separately identified by the reference numerals 7a and 7b) of the heating element 14 are receivable in separate female sockets 20a and 20b of a known type, which have terminals 21a and 21b, respectively. To terminal 21a is connected one insulated wire 22a of the electrical current carrying cord 10 and to the other terminal 21b of the other female socket 20b is connected a short current carrying, insulated wire 23 which extends to a terminal 24.

The current carrying wire 22b of cord 10 is connected with terminal 25. Indicator light 26 has its terminals connected across the terminals 24 and 21a. Terminal 24 connects the current carrying wire 23, through the metal arm 27, with the lower resilient current carrying arm 28. Terminal 25 connects the current carrying wire 22b, through arm 29, with the upper resilient current carrying arm 30. Arm 28 carries an electrical contact 31 and resilient current carrying arm 30 carries an electrical contact 32. The normal resting position of arms 28 and 30, if uninfluenced by other than normal room temperature, would be the positions shown in FIGURE 6 with contacts 31 and 32 slightly separated. That corresponds to the "off" position of the dial or pointer 12. When the user rotates the dial 12 to a heating position pin 58 will move resilient current carrying arm 30 downwardly to cause its contact 32 to engage contact 31, thereby completing a circuit from the source of electricity through the heating element 14 of the utensil and back to the source. The circuit would include wire 22a, terminal 21a, socket 20a, terminal 7a, heating element 14, the other terminal 7b, the other socket 20b and its terminal 21b, current carrying wire 23, terminal 24, arm 27 and the integral resilient arm 28, contact 31, contact 32, resilient arm 30 and its integral arm 29, terminal 25 and thence to the current carrying wire 22b. Under such circumstances the indicator light 26 will be lit.

The foregoing circuit will be established when the user engages the control 8 with the terminals 7 and moves the dial 12 to any of the heating positions indicated by the scale 12a (FIGURE 1).

The resilient current carrying arms 28 and 30 are mounted in spaced relation and are electrically insulated from each other by a series of insulating washers 33. Arms 28 and 30 and the washers 33 have rectangular apertures which fit over a rectangular boss 34 which is formed integrally with the housing 9. The boss 34 is also hollow and has cast, or otherwise fixed in it a threaded sleeve 35 into which a screw 36 may be threaded. A washer 37 is disposed between the head of the screw and the outer end of boss 34 and against the lowermost washer 33, as viewed in FIGURE 6. In this way the stack of insulating washers 33 and the contact arms 28 and 30 are fixedly located and held in position when screw 36 is threaded into the sleeve 35.

It will be observed that the resilient current carrying arm 28 has an extension 28' beyond its contact 31, which extension is adapted to be engaged by an insulating button or member 38. The insulating button 38 passes through an aperture 39 in the bi-metal strip 40. The head 41 of the insulating button rests on the top of the bi-metal strip 40 and the button is held in the aperture by means of a U-shaped strip 42 which passes over it and which is connected to the bi-metal strip 40. The greater part of the bi-metal strip 40 is located in the hollow, or tubular, probe 11 and is so spaced relative to the wall 46 of the probe that it has ample room for movement without engaging the wall 46. Probe 11 has a tip 43 with a bevelled forward end 44 and a reduced neck portion 45. The outermost end of the hollow or tubular member 46 of probe 11 is crimped or spun into the neck portion 45 to retain the tip 43 connected thereto. Tip 43 has a mounting shoulder 47 which is apertured as at 48. A recess 49 is also provided and the bi-metal strip 40 is supported on the shoulder 47 in direct thermal contact with tip 43 by means of a rivet or other fastening member 50 which extends from the top of strip 40 to the recess 49.

Preferably, the tip 43 is formed of a metal having a higher heat conductivity than that of the tubular portion 46. Tip 43 may be made of copper or brass, for example, and the tubular portion 46 may be made of stainless steel, for example. Tip 43 and the tubular portion 46 have frictional engagement within the cavity 19 of the utensil and serve to conduct heat directly to the bi-metal strip 40. The temperature of the utensil is also conveyed to the bi-metal strip 40 by radiation to strip 40 which is enclosed in the hollow member 46. With the tubular member 46 being made of a less heat conductive metal than the tip 43, less heat is transmitted to the housing of control 8.

Probe 11 is shown as being of circular cross section and that is preferred. It could, however, assume other cross sectional configurations if desired. Housing 9 as its left end, as viewed in FIGURES 5 and 6, has a thickened wall portion 51 which defines an opening and a bearing surface 52. The shape of opening 52 corresponds exactly with the outer configuration of probe 11. It will be observed that the housing 9 is formed of two portions 9a and 9b. Portion 9a is the main body portion of housing 9 and portion 9b is a cover. Preferably, the tubular portion 46 is cast in the half 9a. The cover portion 9b is secured to the portion 9a of the housing by a group of four screws 53 as may be best seen in FIGURE 5.

Also cast in the housing portion 9a is an internally threaded metal sleeve 53. The pointer or dial 12 has a recess 55 in which is frictionally fit a hollow screw 56. The bore 57 of screw 56 is adapted to receive an insulating pin or member 58 which frictionally fits within bore 57. Pin 58's position within bore 57 may be adjusted by the adjusting screw 59 which is threaded into the threaded portion of bore 57, as best shown in FIGURE 6. Pin 58 is adapted to bear by its point against the upper resilient current carrying arm 30 and by means of adjusting screw 59 the position of pin 58 can be adjusted relative to arm 30 when the control is being manufactured. During use of the control 8, in connection with the electrically heated skillet, rotation of the pointer or dial 12 by the user causes its screw 56 to be threaded inwardly or outwardly of the sleeve 53 and such movement depresses or raises the pin 58 relative to the resilient current carrying arm 30 in order to change or control the temperature desired for the utensil.

It will be observed that the pointer or dial 12 has a peripheral flange 60. Flange 60 seats beneath a retaining ring 61 of right angle construction, which ring has a plurality of downwardly extending tabs 62 which pass through mating apertures 63 in the wall of housing portion 9a and are then bent, as indicated, to secure the ring relative to the housing and the dial 12. Either on the ring 61 or on adjacent surfaces of the housing 9 will be the temperature scale 12a to guide the user in setting the dial or pointer 12. While dial 12 is shown of generally circular configuration and as having an indicating ridge or pointer portion 64, it will be appreciated that other forms of dials or pointers could be used. Other forms of retaining means than ring 61 may also be employed.

Housing portion 9a has an aperture 65 provided with a shoulder in which there may be seated a plastic or glass window 13 which is disposed above the indicator light 26. The light 26 is located in a translucent support 67 and rests on an upstanding boss 68 formed in the cover portion 9b. As noted before the terminals of lamp 26 are connected to terminals 21a and 24 and the lamp is lit when the circuit is closed and the utensil is being heated.

Referring now to the modified structure in FIGURES 9 and 10, it will be noted that the current carrying wires 22a, 22b and 23 have been eliminated for clarity of description. Also, where the structure shown in FIGURES 9 and 10 is similar to that of FIGURES 5 through 8, the same reference numerals have been applied. The significant difference between the structure of FIGURES 9 and 10 and that of FIGURES 5 through 8 resides in the fact that the hollow tubular member 46 is formed out of a sheet of metal and has integrally connected with it a plate-like portion 69 which is somewhat channel shaped in cross section for purposes of rigidity. I have referred to the tubular portion 46 and the plate-like portion 69 as constituting a supporting structure which is designated generally by the reference numeral 70. The movable resilient current carrying arms 28 and 30 are insulatingly supported from this supporting member 70 at its plate-like portion by a stack of insulating washers 33, 33a and 33b which are secured to the supporting member 70 by a hollow rivet 71. The hollow rivet 71 fits over a correspondingly shaped boss 72 of the housing which boss is a locating means. The supporting structure 70 is itself principally supported in the passageway or opening 52 in the housing 9. In this instance it will be observed that the housing 9 is formed of two parts 9a and 9b which have a separation or parting line A which is centrally located.

Supporting member 70 also supports by the plate-like portion 69 the threaded sleeve 53 and in turn thereby supports the screw 56 and pointer, or dial 12. Sleeve 53 has a neck portion 73 which fits in the aperture 74 of the plate-like portion 69.

From this it will be seen that the bi-metal strip 40 is supported in the tubular portion 46 and the dial 12 and its associated structure and the current carrying arms 28 and 30 and their contacts are all supported from a common member 70. This has the advantage that all of the control elements and movable contact arms are rigidly mounted on a common base instead of being supported from separate portions of the housing which is made of an insulating material which might be cracked by being dropped or distorted by excessive heat. Consequently, the initial adjustment of the device at the factory can be more readily maintained in usage than would be the case of the structure shown in FIGURES 5 through 8.

Referring next to FIGURES 12 through 14 a further modification will be described. However, the same reference numerals as heretofore used will be used on such parts of the structure as are the same as appear in the prior figures of the drawings. As may be best seen in FIGURES 13 and 14, the probe 11 has integrally formed with its heat conducting tip 43 a flange 75 which provides a lower locating shoulder 47 and an upper locating shoulder 76. The bi-metal strip 40 is secured directly in thermal relation against the lower shoulder 47 by a rivet 50 and the stack of insulator washers 33 and contact bearing resilient arms 28 and 30 are supported in series on the upper locating shoulder 76 by the same rivet 50. The insulating member 38 carried at the free end of bimetal strip 40 extends through an opening 77 in the contact bearing arm 30 and engages a button 78 carried by the contact bearing arm 28. As may be seen, both arms 28 and 30 are supported within the tubular housing 46 of probe 11 and are disposed generally parallel to the bi-metal strip 40.

Arm 30 has an outward extension 30' against which bears an insulating member or pin 79. Pin 79 has a shoulder portion 80 and an upper end 81. Housing portion 9a has a recess 82 in which the shoulder portion of pin 79 is located and guided, with a spring 83 being disposed against the shoulder 80 and extending to the bottom wall 84 of the recess 82. Spring 83 normally urges pin 79 upwardly so that its upper end 81 bears against the cam surface 85 which is located on the under side of the dial or pointer 12. Consequently, rotation of the dial or pointer 12 can cause the pin 79 to move the contact bearing arm 30 relative to the contact bearing arm 28. In that way, the user may set the control 8 to produce a longer or shorter heating period for the utensil. Dial or pointer 12 is supported for rotation on a pivot 86 which is integrally formed on housing portion 9a.

The tubular portion 46 of probe 11 can be assembled as a unit and can be cast in the thickened portion 52 of housing portion 9a, thereby providing a convenient means of assembling the control 8.

The terminals of light 26 (not shown) can be connected across the terminals of the sockets 20a and 20b. Current carrying wire 22a will connect with socket 20a and current carrying wire 22b will connect with terminal 25 (see FIGURE 14). The short current carrying wire 23 extends between the terminal 21b and terminal 24.

While I have shown preferred embodiments of my invention I do not intend to be limited thereto except insofar as the following claims are so limited, since various modifications of the structure coming within the scope of my invention will readily suggest themselves to those skilled in the art, now that they have my disclosure before them.

I claim:

1. A thermostatic control device for use with a separable electric heater comprising a housing having a forward wall including at least three spaced openings, a pair of spaced electrical terminals accessible through two of said openings, a make and break switch within said housing and electrically connected with at least one of said terminals, said switch comprising a pair of flexible contact bearing spring arms adjustable into and out of engagement with each other to regulate electrical energy flow therethrough to said terminal, and an elongate rigid temperature sensing probe fixed in said housing and extending outwardly of the housing through the third of said openings and forwardly of said forward wall in fixed parellel relation to the said terminals, the outer surface of said probe being heat conductive along its length, and bi-metallic means directly connected at one end to said probe, said bi-metallic means having its opposed end free and insulative means disposed between said free end and the switch, whereby the switch is opened and closed as the bi-metallic means flexes in response to variations of temperature sensed by said temperature sensing probe.

2. A thermostatic control device for use with a separable electric heater comprising a housing containing a pair of spaced electrical terminals engageable through one end thereof, a temperature sensing probe having an end part within said housing, a switch comprising a pair of spaced contact bearing arms mounted at one end on said end part of the probe and in electrically insulated relation to each other and to said end part, said arms having portions adapted for movement into and out of contact with each other to regulate electrical energy flow through said terminals, said temperature sensing probe including a solid portion of high heat conductive material extending forwardly of said end of the housing in spaced parallel relation to said terminals, bi-metallic means fixed at one end to said high heat conductive portion so as to be directly influenced thereby, said bi-metallic means having insulating means remote from said connected end acting on one of said contact bearing arms to open and close said switch in response to variations of temperature sensed by said probe, and control means externally of said housing and including a part acting on the other contact bearing arm, said control means being manually adjustable to vary the spacing of said contact bearing arms.

3. A control unit for an electrically heated device which may be readily detached therefrom, said unit comprising a pair of spaced terminal receiving members for detachable electrical connection with a pair of similarly spaced terminals of an electrically heated device, conductors having one end adapted for connection to an electrical current supply and their other end electrically connected with said terminal receiving members, switch means arranged to regulate the flow of current through said conductors, and a hollow temperature sensing probe disposed between said terminal receiving members and extending forwardly thereof parallel to said terminal receiving members for sensing the temperature of the device when the control unit is detachably connected to the terminals thereof, said probe being at least in part of thermally conductive metal, and a bi-metallic thermally reactive member mounted in said probe, said probe enclosing the reactive member, and said reactive member acting on the switch means in response to temperature changes it senses through said thermally conductive metal of the probe so as to regulate the flow of current through the conductors.

4. A control unit for an electrically heated device which may be readily detached therefrom, said unit comprising a housing having a pair of spaced terminal receiving members adapted for detachable friction catching with a pair of similarly spaced terminals of an electrically heated device, a pair of conductors electrically connected with said terminal receiving members, adjustable control means to interrupt the flow of current through said conductors, and a hollow temperature sensing probe disposed between said terminal receiving members and extending externally of the housing for sensing the temperature of the device when the control unit is detachably connected to the terminals thereof, and a bi-metallic element mounted in said probe adjacent the tip thereof and having a portion acting on the control means to interrupt and restore the flow of current through the conductors in response to temperature changes sensed by the probe, together with adjustment means acting on the control means to vary the temperatures at which said control means will interrupt and restore the flow of current through the conductors.

5. A control unit for an electrically heated device which may be readily detached therefrom, said unit comprising a housing provided with a pair of spaced terminal receiving members adapted for detachable connection to a pair of similarly spaced terminals of an electrically heated device, a pair of conductors leading into said housing and electrically connected with said terminal receiving members, adjustable control means to interrupt the flow of current through at least one of said conductors, and a hollow probe extending externally for the housing and having a portion of higher thermal conductive material than the remainder of the probe for sensing the temperature of the device when the control unit is detachably connected to the terminals thereof, and a bi-metal member enclosed within said probe and thermally connected with said portion, said member being operatively associated with the control means to regulate the flow of current through the conductors in response to temperature changes sensed by said portion of higher thermal conductive material.

6. An adjustable thermostatic control device for a utensil through which the utensil is connected to a source of electrical power for heating the same, said device being readily and conveniently separable therefrom as a unit when it is desired to submerge the utensil in water for washing, and comprising a housing, a pair of current carrying members therein electrically connected to a pair of spaced friction connection means adapted to be connected to and to supply electrical energy to the terminals of an electrically heated utensil, thermostatic control means adapted to interrupt the flow of current through said current carrying members to said friction connection means, said thermostatic control means being disposed at least in part in a hollow member extending outwardly of said housing, said hollow member being so related to the friction connection means as to be insertable, with the connection of said means to the terminals of the device, into a cavity of the electrically heated device for sensing its temperature, said housing having a passage through a wall thereof, and said hollow member comprising a tube supported in said passage and having a heat conducting tip of higher thermal conductivity than the tube, said thermostatic control means comprising a bi-metal element connected with said tip so as to flex in response to changes in temperature sensed by the tip of said probe, at least one of said current carrying members including a switch having a part which is resilient so that it may be moved to open and close the switch, and said bi-metal element being adapted to move said resilient part when flexed and being electrically isolated from said current carrying members and switch, and adjustment means for regulating the temperature at which said bi-metal element interrupts the flow of electrical energy through said current carrying members.

7. An adjustable thermostatic control device according to claim 6 wherein the adjustment means comprises a manually settable member having a cam surface which bears on a spring loaded insulated element which is associated with one of said contacts.

8. An adjustable thermostatic control device according to claim 6 further having a window in the housing and lamp means connected between the terminal connection means so as to be visibly energized by the flow of electrical energy through the current carrying members.

9. In a control unit for an electrically heated device which may be readily detached therefrom, a plate-like portion, a hollow tube supported thereby, a supporting post fixed on said plate-like portion, a pair of contact bearing spring members each having an end mounted on said post and electrically insulated from each other and from said plate-like portion by spacers of insulating material, bi-metallic means within said tube and having one end secured to adjacent the distal end of the tube, said bi-metallic means having its opposite end positioned to bear against one of said contact bearing spring members causing the same to move into and out of electrical contact with the other contact bearing spring member in response to changes of temperature sensed by the tube, and a stem carrying knob threadedly mounted on said plate-like portion, said stem engaging the other one of said spring members to vary the separation of the spring members, and means electrically connected with said ends of the spring members mounted on the post by which a pair of current carrying wires may be electrically connected thereto.

10. A detachable temperature controlling connector unit for an electrically heated device having a pair of terminals extending therefrom, said connector unit comprising a housing, a pair of spaced terminals for cooperating with the said first terminals to permit applying electrical energy thereto, a support mounted within said housing and carrying a tubular member extending outwardly from said housing in parallel relation to the terminals thereof, said tubular member being adapted to be positioned in heat transfer relation with the said device when its said terminals are positioned in cooperation with the said first terminals of the device, a pair of resilient contact carrying members on said support and connected to control the application of energy to said terminals, adjustable means for fixing the position of one of said contact carrying members, and bi-metallic means within said tubular member connected at one end to the remote end of the tubular member and having its free end adapted to act on the other of said contact carrying members to actuate the contact carrying members in response to temperature changes sensed by said tubular member, the temperature at which said actuation of the contact carrying members takes place being determined by the position of said one contact carrying member.

11. An electrical heating device comprising a utensil having a bottom wall to be heated, an electrical heating element on the underside of said bottom wall terminating adjacent the outer periphery thereof in a pair of parallel terminal posts extending clear of said periphery for convenient access, said bottom wall being provided with an elongated recessed portion having an entrance adjacent said terminal posts and extending parallel thereto, said recessed portion being heated by the heating element, and detachable means including a pair of terminals engageable with said terminal posts, means for connecting said terminals to a source of electrical power including a pair of contacts in series with at least one of said terminals, a pair of switch arms insulated from each other and each carrying one of said contacts, adjustable means acting on one of said arms to variably set the position of said arm and contact borne thereby, and temperature sensing means including an elongated projection having an end portion of relatively high heat conductive metal disposed forwardly of said terminals and shaped to be received in said temperature sensing zone, the remainder of said temperature sensing means being of lower heat conductivity, bi-metallic means having one end connected to said end portion, said bi-metallic means being adapted to flex in response to heating and cooling of said end portion, the other end of said bi-metallic means being free, and insulative means carried by said free end to engage the other contact bearing arm to move its contact relative to the contact of the variably set arm in response to temperature changes sensed by the heat conductive end portion of the temperature sensing means.

12. An electrical heating device comprising means to be heated, electrical heating means therefor including electrical terminals, a temperature sensing zone for said means to be heated, and means detachable from said device, said detachable means being connectable to a source of electrical energy for conducting and regulating the flow of electrical energy to said device and including electrical terminals cooperable with a first-mentioned terminals, a pair of relatively movable contacts in series with at least one terminal of said deachable means, and a temperature sensing tubular projecting member which has controlling action on the flow of electrical energy to said heating means, said member being adapted to be disposed in said temperature sensing zone when said terminals are in cooperating relation and having a solid portion of heat conducting metal, a bi-metal contact-operating element at least partially within said projecting member and in heat conducting relationship with said solid portion and adapted to cause movement of one of said contacts relative to the other.

13. A cooking utensil such as described comprising a container having a waterproof electrical heating element on its underside, the ends of said heating element being disposed in spaced adjacent relation and terminating in a pair of outwardly projecting parallel spaced terminal prongs, said container further having a socket on its underside in thermal communication therewith, said socket being located between said spaced ends of the heating element and having its axis paralleling said prongs, and readily removable control means for connecting said heating element with a source of electrical power and operative to thermostatically control the passage of electrical power to said heating element, said control means embodying a housing having a pair of spaced prong receiving receptacles in one side thereof to frictionally receive the prongs and establish a readily detachable electrical connection therewith, said housing further having a hollow, rigid temperature sensing probe extending outwardly from said side of the housing and intermediate the prongs to extend within said socket when the prongs are frictionally received in said receptacles of the control means, a switch for making and breaking electrical contact of one of said receptacles with the power source, bi-metallic means having one end fixed within the temperature sensing probe and a free end coupled to said switch for operating said switch in accordance with a change of temperature sensed by the temperature sensing probe, and adjustment means for varying the temperature at which said switch makes and breaks contact.

14. An electrically heated utensil adapted for use with a detachable thermostat having a temperature sensing probe, said utensil on detachment of the thermostat being completely immersible in water and comprising a food receiving vessel having heat insulating supporting means, and having hand grip means for convenient manipulation thereof, said vessel having a bottom wall of heat conductive metal and a depending portion of heat conductive metal integral with said bottom wall at the margin thereof, said depending portion having a bore extending therethrough with two open ends, the outer one of said open ends forming an entrance directed to the outside of the utensil, said bore affording metallic heat transmitting material along its entire length and adapted to receive the temperature sensing probe of a detachable thermostat through said entrance, a metal sheathed electrical heating element secured in thermal contact against the bottom wall of th utensil to uniformly heat the same and having its two end portions extending into and through said depending portion along opposite sides of said bore, the ends of the heating element being waterproofed, a pair of terminal posts electrically connected to said ends of the heating element and extending outwardly from said depending portion parallel to said bore for electrical connection with said detachable thermostat when the probe is received in the bore, said terminal posts having their outer ends projecting beyond the periphery of said bottom wall of the utensil for convenient access thereto, and a removable guard fastened to said utensil and generally surrounding said posts but extending outwardly of the utensil approximately only as far as the outer end of said terminal posts.

15. An electrically heated utensil having a bottom wall of heat conductive metal, a depending lug of heat conductive metal integral with said bottom wall adjacent the periphery thereof, electrical heating means on said bottom wall having end portions extending into said lug and terminals connected to said end portions extending outwardly from the lug, said lug having a bore extending therethrough generally between said end portions and parallel to said terminals, said lug being conductively heated by said end portions of the electrical heating means as well as receiving heat from the bottom wall of the utensil, and the wall of said bore affording metallic heat transmitting means along its entire length, said utensil further including means detachable therefrom, said detachable means being connectable to a source of electrical energy for conducting and regulating the flow of electrical energy therethrough to said device and including electrical terminals cooperable with the first-mentioned terminals, and a temperature sensing projecting member which has controlling action on the flow of electrical energy to said electrical heating means, said projecting member being formed so as to have substantial contact with said wall of the bore along the length thereof when said electrical terminals are in cooperating relation so as to be immediately sensitive to changes in temperature of the lug as heated by said end portions of the heating means in said lug and by the bottom wall of the utensil.

References Cited in the file of this patent

UNITED STATES PATENTS

| | | |
|---|---|---|
| Re. 20,570 | Bushway | Dec. 7, 1937 |
| 1,047,536 | Kercher | Dec. 17, 1912 |
| 1,431,542 | Ross | Oct. 10, 1922 |
| 1,481,233 | Sieben | Jan. 15, 1924 |
| 1,596,018 | Mueller | Aug. 17, 1926 |
| 1,613,261 | Anthony | Jan. 4, 1927 |
| 1,641,002 | Kaplan | Aug. 30, 1927 |
| 1,662,817 | Bollmann et al. | Mar. 20, 1928 |
| 1,720,837 | Hynes | July 16, 1929 |
| 1,772,279 | Fonseca | Aug. 5, 1930 |
| 1,793,954 | Myers | Feb. 24, 1931 |
| 1,813,267 | Arnesen | July 7, 1931 |
| 1,916,111 | Kump | June 27, 1933 |
| 1,990,351 | Shroyer | Feb. 5, 1935 |
| 2,524,954 | Best | Oct. 10, 1950 |
| 2,571,782 | Swenson | Oct. 16, 1951 |
| 2,744,995 | Jepson | May 8, 1956 |

FOREIGN PATENTS

| | | |
|---|---|---|
| 599,517 | Great Britain | Mar. 15, 1948 |
| 648,211 | Great Britain | Jan. 3, 1951 |
| 474,502 | Canada | June 12, 1951 |
| 664,113 | Great Britain | Jan. 2, 1952 |
| 725,341 | Great Britain | Mar. 2, 1955 |